United States Patent [19]

Wilson

[11] 4,065,141
[45] Dec. 27, 1977

[54] BULK MAIL CONTAINER

[75] Inventor: James D. Wilson, Newport Beach, Calif.

[73] Assignee: Banner Metals Div. of Intercole Automation, Compton, Calif.

[21] Appl. No.: 749,732

[22] Filed: Dec. 13, 1976

Related U.S. Application Data

[63] Continuation-in-part of Ser. No. 688,143, May 20, 1976, abandoned.

[51] Int. Cl.² .............................................. B62B 11/00
[52] U.S. Cl. ............................ 280/33.99 H; 211/150; 280/79.3
[58] Field of Search ................ 280/33.99 H, 33.99 R, 280/33.99 F, 79.1, 79.3; 211/150; 312/138

[56] References Cited

U.S. PATENT DOCUMENTS

| | | | |
|---|---|---|---|
| 3,840,242 | 10/1974 | Craig et al. | 280/33.99 H |
| 3,861,702 | 1/1975 | Wilson | 280/33.99 H |
| 3,861,704 | 1/1975 | DeWitte | 280/79.3 |
| 3,861,768 | 1/1975 | Wilson | 280/33.99 H |
| 3,874,689 | 4/1975 | Morgan | 280/33.99 H |
| 3,953,044 | 4/1976 | Wilson | 280/33.99 H |

Primary Examiner—Joseph F. Peters, Jr.
Assistant Examiner—David M. Mitchell
Attorney, Agent, or Firm—Keith D. Beecher

[57] ABSTRACT

A container is provided for bulk mail, and the like, which has the form of a wheeled rack. The container is constructed to have a lower shelf and an intermediate shelf, both of which are hinged to a frame, and both of which may be turned to an upright position when the container is not in use to enable the container to be nested into other like containers so as to conserve space. Also, the intermediate shelf may be turned up when the container is in use to provide sufficient space within the container for large or bulky packages or mail sacks. The container also has a flexible webbing member attached to the forward edge of a hinged frame which supports the intermediate shelf. The webbing member may be extended upwardly and downwardly from the forward edge of the frame across the open front of the container to enclose the upper and lower portions of the open front so as to retain the load within the container.

6 Claims, 4 Drawing Figures

BULK MAIL CONTAINER

This application is a continuation-in-part of Copending Application Ser. No. 688,143, filed May 20, 1976 and now abandoned. The container of the invention is similar in some respects to the container described and claimed in U.S. Pat. No. 3,928,681, which issued Mar. 15, 1960 to the present inventor; in Application Ser. No. 477,805, which was filed July 10, 1974 in the name of the present inventor; and in Application Ser. No. 562,830, Now Pat. No. 3,953,044, which was filed Mar. 28, 1975 in the name of the present inventor.

BACKGROUND OF THE INVENTION

The bulk mail container of the invention is particularly suited for carrying trays, packages, or sacks of bulk mail between a main post office and sub-station post offices. The container is equipped with a bottom shelf and an intermediate shelf for this purpose, both of which may be turned to an upright position, as mentioned above, to permit mutual nesting of the unused containers to conserve space; and in which the intermediate shelf may be turned to an upright position to provide space for large and bulky packages and mail sacks within the container.

The container of the invention, as mentioned above, has a web-like member which forms upper and lower front gates for the container, and which is attached to the forward edge of a hinged frame which supports the intermediate shelf. The web-like member is extended upwardly and downwardly from the forward edge of the frame to enclose the open front of the container when the frame is turned down to a horizontal position. The upper and lower ends of the web-like member may be locked to the container as a security measure for the contents of the container.

DETAILED DESCRIPTION OF THE ILLUSTRATED EMBODIMENT

Figure 1:
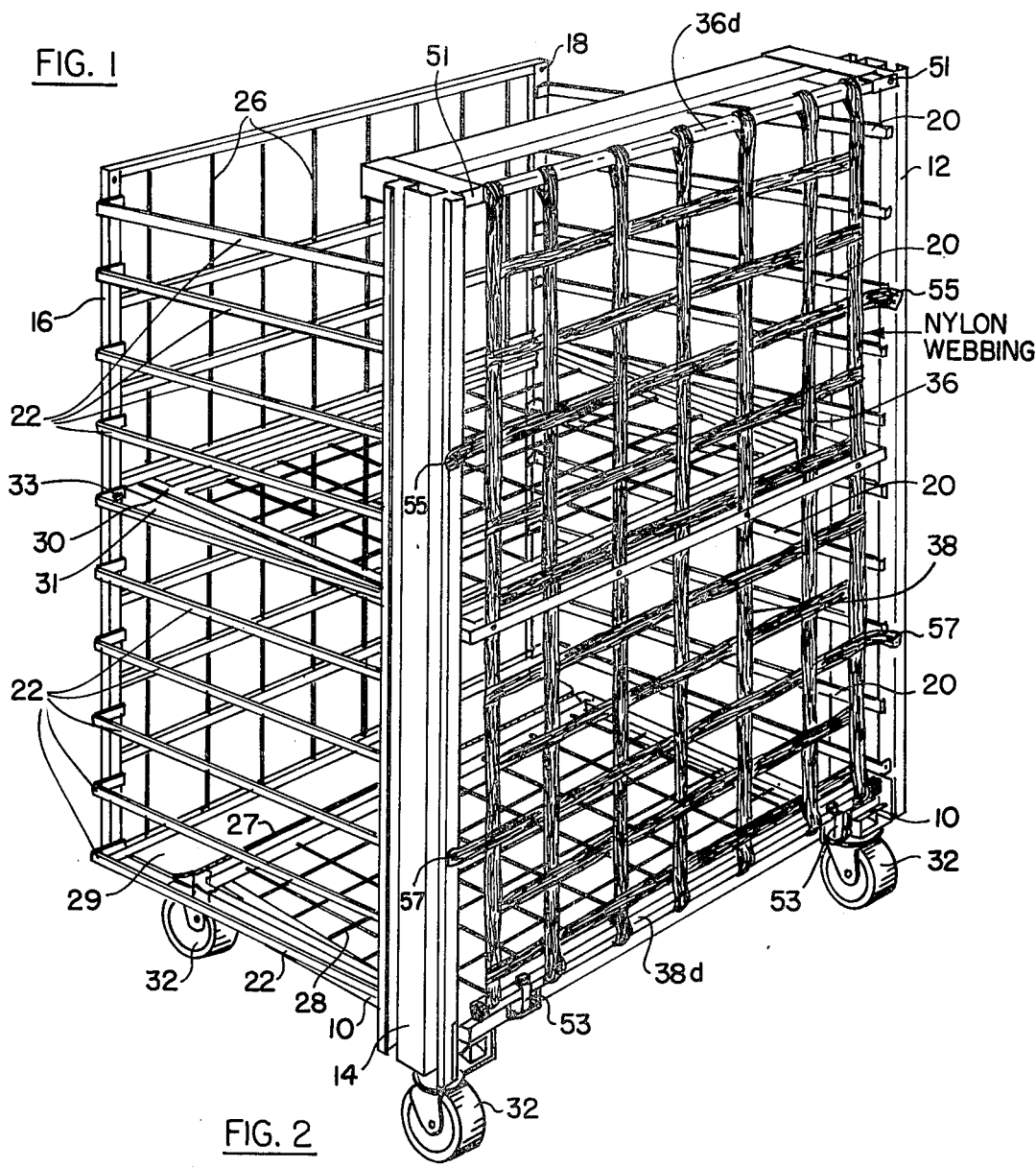
FIG. 1 is a perspective representation of a container constructed in accordance with one embodiment of the invention.

The bulk mail container illustrated in the drawing includes a U-shaped lower frame member 10 which defines an open front for the container, and which has side members which converge outwardly from the rear side of the container. Four upright posts are mounted on the U-shaped frame at the respective corners of the container, these posts being designated 12, 14, 16 and 18 respectively.

A plurality of essentially horizontal struts 20 are welded, or otherwise attached, to the posts 12 and 18, and the struts 20 extend between the posts in spaced and parallel relationship to one another. Likewise, a plurality of generally horizontal struts 22 are welded, or otherwise attached, to the posts 14 and 16, and extend between the posts in spaced an parallel relationship with one another. The struts 20 form one of the side walls of the container, whereas the struts 22 form the second side wall. The side walls diverge outwardly from the rear side to the front side of the container. The container is also equipped with a wireformed rear wall 26, as shown.

The resulting container has an open front which is somewhat wider than the rear wall. The container has a rectangular lower shelf 28 which is hinged along its rear edge to a bottom section 29 by means of a hinge 27. The lower shelf 28 may be turned down to a horizontal load-receiving position, such as shown in FIG. 1, or it may be turned up to an essentially upright position, such as shown in FIG. 2.

The container also has a rectangular intermediate shelf 30 which is pivotally mounted to a rectangular frame 31. A bracket such as bracket 62 (FIGS. 3 and 4), is formed on one of the struts 20 and on one of the struts 22, adjacent to the posts 12 and 14; and these brackets are engaged by brackets, such as bracket 64, on the sides of frame 31 to support the frame in a horizontal position. The widths of the rectangular shelves 28 and 30 correspond to the width of the rear wall 26 of the container, and the shelves are somewhat narrower than the open front.

Figure 2:
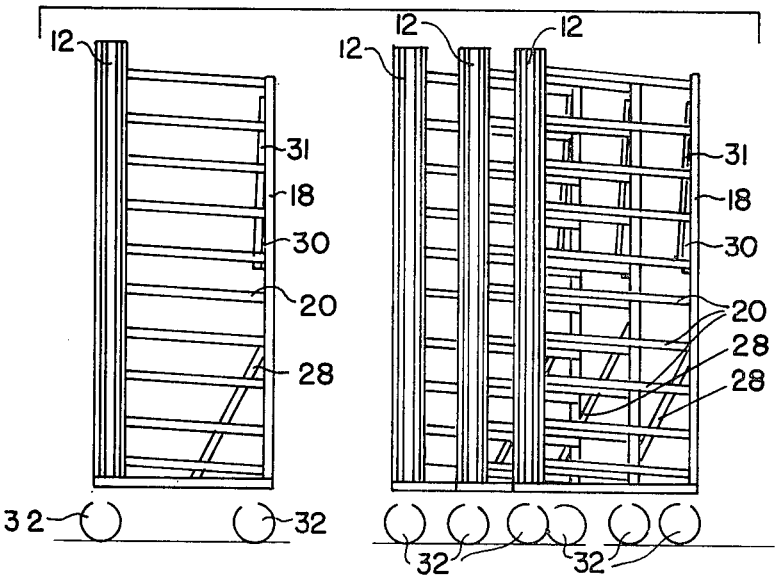
FIG. 2 is a side elevation of a plurality of containers, each constructed in accordance with the invention, and showing the manner in which the containers may be nested into one another when empty and not in use.
Figure 3:
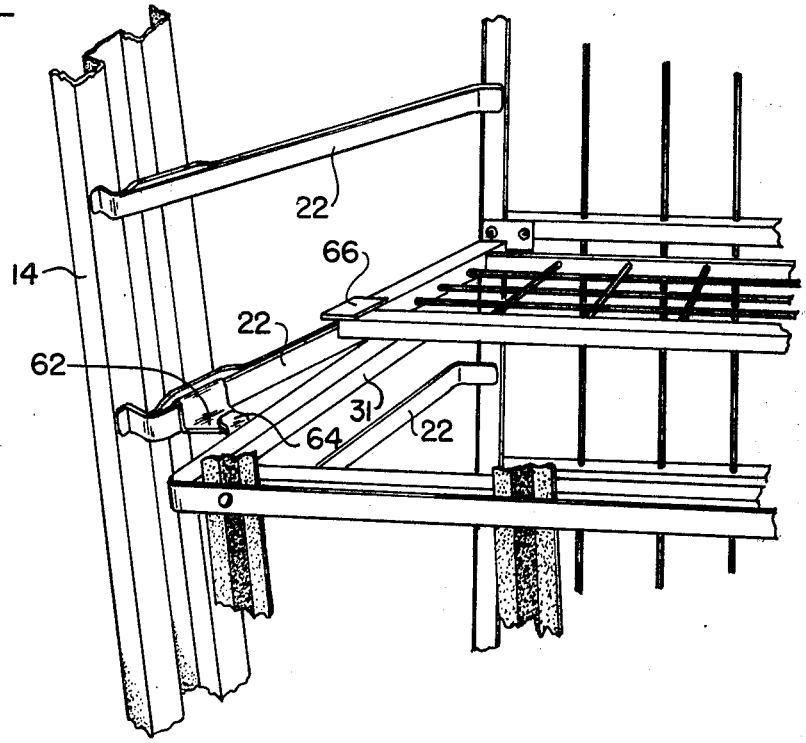
FIGS. 3 and 4 are fragmentary perspective views of the container showing certain details thereof.
Figure 4:
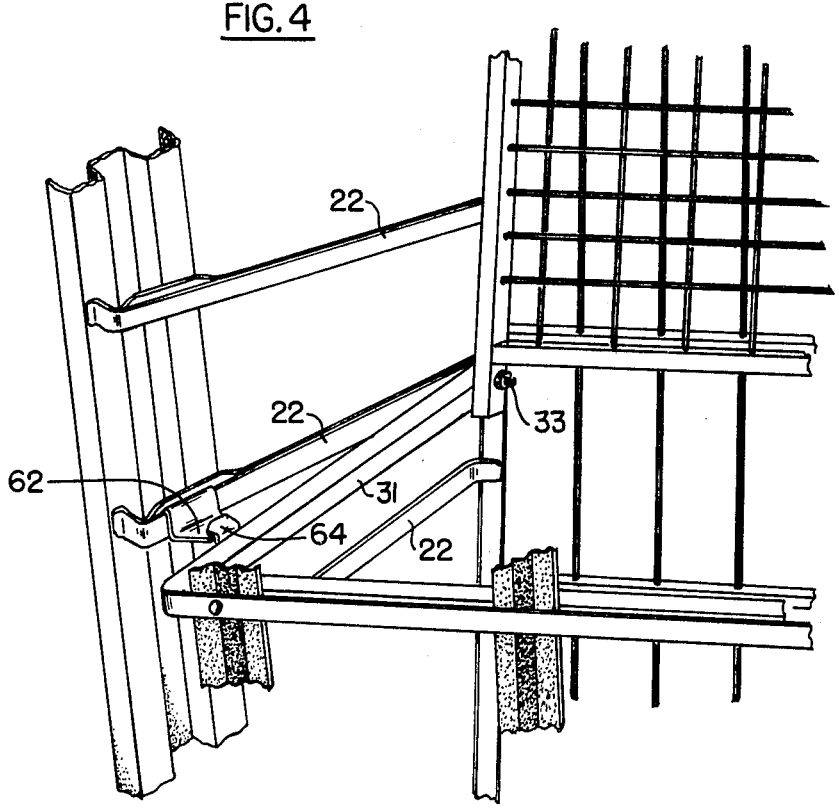

As best shown in FIGS. 3 and 4, the frame 31 and shelf 30 are pivotally mounted to the posts 16 and 18 by means of pins, such as pin 33. the shelf 30 has a bracket, such as bracket 66 on each side, and these brackets engage the sides of frame 31 when the shelf is turned down to a horizontal load-supporting position, such as shown in FIG. 1, so that the frame may support the shelf. The shelf 30 may be turned to an upright position, while the frame 31 remains in the horizontal position, to provide more interior space within the container for large and bulky packages and sacks. However, when the frame 31 is turned to its upright position about the pivot pins 33, it carries the shelf 30 with it, so that both the shelf and frame assume the upright position shown in FIG. 2.

When the container is empty, frame 31 and shelf 30 may be turned to their upright positions, such as shown in FIG. 2, and lower shelf 28 may also be turned to its upright position, so that a plurality of containers similar to the container of FIG. 1 may be nested into one another through their respective open front sides, as shown in FIG. 2. the containers nest by receiving the rear wall of one container through the open front of another container with the side struts 20, 22 of the first container sliding under the corresponding side struts of the second container, as shown in FIG. 2.

The container of the invention has a plurality of casters 32 suspended from the lower frame 10 at the respective corners thereof. The casters 32 may be the usual type of swivel casters. A locking means may be provided for one of the casters 32 when the lower shelf 28 is turned down to its load-receiving position, so as to prevent the caster from turning, thereby facilitating the towing of the container in a train of like containers. This lock may be of the type described and claimed, for example, in U.S. Pat. No. 3,861,702 which issued Jan. 21, 1975 to the present inventor.

A flexible web-like member formed, for example, of nylon webbing, provides an upper gate 36 and a lower gate 38 for the front of the container. The web-like membr is attached along its mid-section to the forward edge of frame 31. When the frame is turned down to its horizontal position, such as shown in FIG. 1, the gates 36 and 38 may be extended upwardly and downwardly to enclose the front of the container.

The upper end of gate 36 is fastened to a cross bar 36d which extends across the front of the container and is received in a pair of U-shaped supports 51 at the top of the posts 12 and 14. The lower end of gate 38 is fastened to a cross bar 38d which extends across the front of the container, and which is received in a pair of clips 53 at the front of frame 10. An intermediate web of the gate 36 may be clipped to the posts 12 and 14 by appropriate clips 55, and an intermediate web of the gate 38 may be clipped to the posts by appropriate clips 57.

Appropriate security locks may be provided to retain cross bars 36d and 38d in their corresponding supports 51 and clips 53. When the container is not in use, the cross bars 36d and 38d may be released from their corresponding supports 51 and clips 53, and folded back over the top of shelf 30. The shelf 30 and frame 31 may then be turned up to the upright position shown in FIG. 2, together with the lower shelf 28. Then, the container is in condition to receive other like containers in a nested relationship, such as shown in FIG. 2.

The invention provides, therefore, an improved bulk mail container which is simple and rugged in its construction, and which is particularly suited for holding the transporting mail packages and sacks. The container has an advantage in that its forward gates may readily be adjusted to enclose fully the front end of the rack, and locked in place for security reasons, if so desired. The intermediate shelf may be turned up to its upright position to permit the container to handle bulky packages. Moreover, when the container is empty, the gates and shelves of the container may be turned to their upright positions, as described above, so as to condition the container to receive other similar containers in a nested condition with respect thereto so as to conserve space.

While a particular embodiment of the invention has been shown and described, modifications may be made. It is intended in the claims to cover the modifications which come within the spirit and scope of the invention.

What is claimed is:

1. A container for bulk mail, and the like comprising: a lower U-shaped horizontal frame having a rear member and side members which diverge outwardly from the rear member and which define an open front; a plurality of spaced and parallel upright posts mounted on the frame at the front and rear thereof; a rectangular-shaped intermediate shelf; a rectangular-shaped intermediate frame surrounding said intermediate shelf, said intermediate frame having a forward edge and a rear edge and being upwardly turnable from a generally horizontal position to an upright position to permit other like containers to be received in the open front of the container; means pivotally mounting the rear end of said intermediate shelf and of said intermediate frame to the posts at the rear of said horizontal frame to permit the intermediate shelf and the intermediate frame to be upwardly turnable from a generally horizontal load-supporting position to an upright position; bracket means mounted on the posts at the front of the horizontal frame to support the intermediate frame in a generally horizontal position; and upper and lower gate members to the forward edge of the intermediate frame to be adjustable to positions enclosing the open front of the container when the intermediate frame is turned down to its generally horizontal position in which the upper gate encloses the area above the intermediate frame and the lower gate encloses the area below the intermediate frame.

2. The container defined in claim 1, in which said intermediate frame is mounted directly under said intermediate shelf; and which includes bracket means mounted on said intermediate shelf to engage said intermediate frame when said shelf is turned to its generally horizontal load-supporting postion to enable said intermediate frame to support said intermediate shelf and to carry said intermediate shelf with it when the intermediate frame is turned from its horizontal position to its upright position.

3. The container defined in claim 1, in which said upper and lower gate members are formed of flexible webbing.

4. The container defined in claim 1, and which includes a rectangular-shaped bottom shelf having a front edge and a rear edge; and hinge means attached to the rear edge of the bottom shelf and supported on the U-shaped horizontal frame member to permit the bottom shelf to be upwardly turnable to an upright position to permit other like containers to be received in the open front of the container.

5. The container defined in claim 1, and which includes a plurality of casters attached to and depending from the lower U-shaped member.

6. The container defined in claim 3, and which includes a first cross bar attached to an upper end of the upper gate member, and a second cross bar attached to a lower end of the lower gate member; support means mounted at an upper end of the front of the container for releasably supporting the first cross bar in position extending across the front of the container at the upper end thereof; and further support means mounted at a lower end of the front of the container for releasably supporting the second cross bar in position extending across the front of the container at the lower end thereof.

* * * * *